United States Patent [19]

Förster

[11] 3,825,822

[45] July 23, 1974

[54] APPARATUS FOR INSPECTING THE QUALITY OF SHORT, ELECTRICALLY CONDUCTIVE WORKPIECES BY THE EDDY CURRENT TEST METHOD

[76] Inventor: Friedrich M. O. Förster, Grathwohlstrasse 4, 7410 Reutlingen, Germany

[22] Filed: May 29, 1973

[21] Appl. No.: 364,608

[30] Foreign Application Priority Data
Sept. 23, 1972 Germany.......................... 2246871

[52] U.S. Cl................................ 324/40, 209/81 R
[51] Int. Cl............................................. G01r 33/00
[58] Field of Search ........ 324/40, 37, 34 R, 34 MC, 324/34 O; 209/81 R

[56] References Cited
UNITED STATES PATENTS
3,068,380 12/1962 Lamoreaux................ 324/34 MC X FOREIGN PATENTS OR APPLICATIONS
597,705 2/1948 Great Britain.................... 324/34 R OTHER PUBLICATIONS
Bovey, D.; Design & Applications of a New Metals Comparator; Instruments; May, 1948; pp. 467–470.

Primary Examiner—Robert J. Corcoran
Attorney, Agent, or Firm—Ervin B. Steinberg

[57] ABSTRACT

Short apertured electrically conductive workpieces, such as nuts, ball bearing races or wrist pins are inspected by the eddy current test method by establishing an alternating magnetic field which causes eddy currents in the workpiece portion surrounding the aperture. The magnetic field is shaped in such a manner as to prevent a significant portion of the magnetic lines from being intercepted by the workpiece.

9 Claims, 2 Drawing Figures

PATENTED JUL 23 1974

3,825,822

APPARATUS FOR INSPECTING THE QUALITY OF SHORT, ELECTRICALLY CONDUCTIVE WORKPIECES BY THE EDDY CURRENT TEST METHOD

BACKGROUND OF THE INVENTION

This invention relates to an apparatus for inspecting the quality of short, electrically conductive workpieces which have an aperture surrounded by the material of the workpiece, such as nuts, ball bearing races or wrist pins. For inspection the workpiece is subjected to an alternating magnetic field which induces eddy currents in the workpiece and the loading resulting from the eddy currents and reflected upon the alternating magnetic field is used for evaluating the quality of the respective workpiece.

Arrangements of the type indicated above have been known for some time in a number of different embodiments. In the most frequently employed arrangement, workpieces to be inspected are fed into an area delineated by an air-core coil which is supplied with alternating current. The alternating field produced by the coil penetrates the workpiece and causes eddy currents in the workpiece with the lines of magnetic flux of the eddy current becoming superimposed upon the primary field of the coil. In addition to the location and the dimensions of the workpiece, the coil specifications and the frequency of the alternating current energizing the coil, the change of impedance of the coil brought about by the eddy currents depends also on the magnetic permeability and on the electrical conductivity of the workpiece. While the parameters first indicated heretofore remain generally constant, the last two mentioned electromagnetic parameters, i.e., magnetic permeability and electrical conductivity, provide important information pertaining to such related material properties as alloy, heat treatment and structure of the workpiece, so that in many instances, in particular on elongated workpieces, a satisfactory inspection as to quality can be performed using apparatus of the type described. On the other hand, when testing short workpieces it is noted repeatedly that differences in quality are masked in the readout of the inspection apparatus by variations caused by dimensional changes of the workpiece. This effect is all the more disturbing as these variations may quite possibly fall within the permissible tolerance range. Even with inspection apparatus providing phase-selective indication, it is frequently not possible to achieve a satisfactory separation between the various properties although the phase angle is varied for finding a suitable angle.

This phenomenon results from the problem described hereafter. Aside from the electrical conductivity, the magnetic permeability of workpieces assumes special significance for parts made of ferromagnetic material. In the case of short workpieces, a magnetic field does not in itself indicate the magnetic permeability of the material, but the so-called shape permeability enters the picture, the latter permeability being not a material parameter but purely a shape parameter, i.e., a value which is a function of the geometric shape of the workpiece. It readily will be discerned that in view of this condition the dimension parameters significantly affect the sorting results, especially when short workpieces are tested. In addition to the dimensions of the workpiece, the shape permeability of a workpiece is affected also by the frequency of the magnetic field to which the workpiece is subjected. As is known, the higher the test frequency, the lower the depth of penetration of the magnetic field produced by the test coil. With very high frequencies, i.e., with a correspondingly low depth of penetration, the workpiece acts as if it were thin-walled because the interior of the workpiece is no longer penetrated by the alternating magnetic field. The thinner the wall of a workpiece, the lower its demagnetization factor and the larger its shape permeability, provided, of course, that for constant fields the permeability of the material is significantly higher than the shape permeability of the workpiece.

These interrelations most suitably can be illustrated by an example. A ball has a shape permeability of $\mu_F = 3$. If the ball is located in the field of a magnetic coil energized with low frequency current, the permeability of the material which, for example, may have a magnitude $\mu_{rel}$ from 100 to 1,000 does not manifest itself during such electromagnetic testing. On account of the high magnetization factor only the material independent shape permeability of $\mu_F = 3$ will be apparent. Thus, differences in quality arising from variations of the material permeability and the electrical conductivity of the ball material, which normally would permit sorting according to alloy, hardness or strength, are not apparent. The material permeability becomes more pronounced only if test frequencies are used which provide a low depth penetration relative to the dimensions of the workpiece. However, the use of high test frequencies is frequently undesirable, as high frequencies limit the information to a thin outer layer of the workpiece. The same considerations apply if, instead of balls, similar short parts are inspected.

Workpieces having an opening surrounded by material account for a significant portion of short parts. Among these number such mass-produced items as nuts, ball bearing races and wrist pins, the sorting of which for quality is of major importance for the respective manufacturers. An object of this invention is, therefore, the provision of an arrangement for testing the above recited workpieces. More specifically, the arrangement described permits electromagnetic inspection of parts indicated above using the loading effect of eddy currents on an alternating current magnetic field.

The solution provided by the instant invention resides in the provision of an alternating magnetic field producing a magnetic flux which extends primarily through the opening contained in the workpiece, without that a significant portion of the flux penetrates the workpiece itself. In this manner, the workpiece, for all practical purposes, is not magnetized by the alternating field, and magnetic poles are not formed. As a result, there is an absence of the shearing effect of the workpiece caused by the formation of poles. Therefore, during electromagnetic testing the shape permeability, which is greatly reduced by the shearing effect and only slightly dependent on the metallurgical state of the workpiece, is not manifest; instead there will be apparent the actual material permeability, a physical parameter sensitive to the metallurgical characteristics being investigated.

The invention discloses arrangements concerning the provision of a desired flux pattern using an electromagnetic coil suitably dimensioned for the workpiece under inspection.

DETAILED DESCRIPTION OF THE INVENTION

Figure 1:
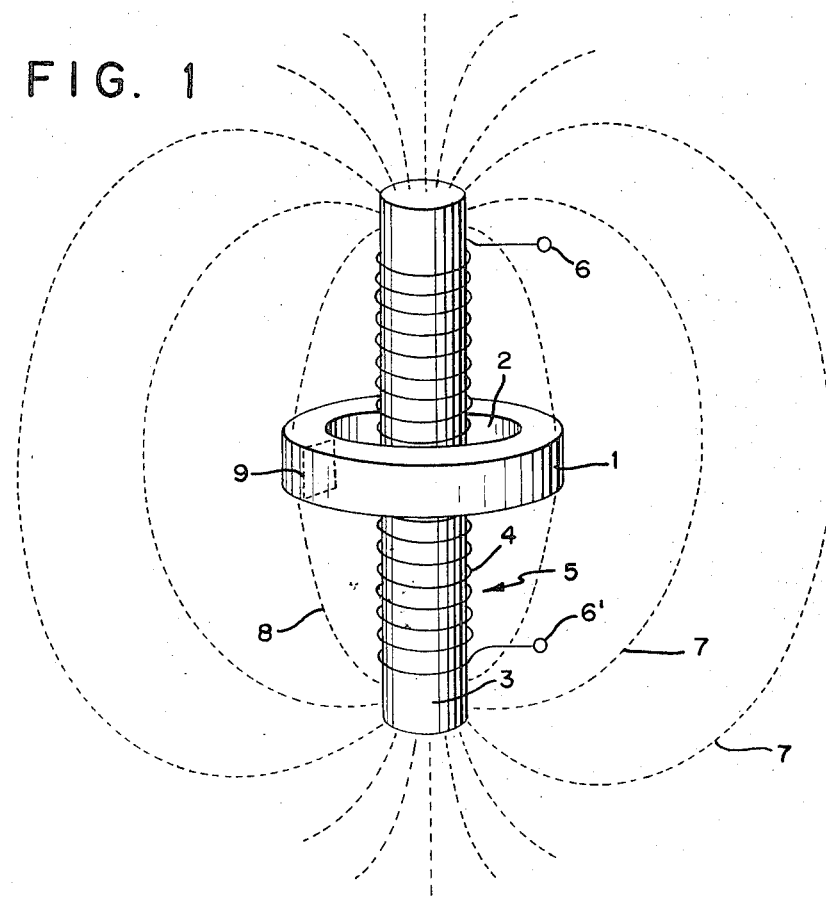
FIG. 1 is a schematic illustration of the coil arrangement when testing a typical workpiece of the type discussed hereinabove.

Referring now to FIG. 1, numeral 1 identifies a ball bearing race to be inspected. Extending axially through the central opening 2 of the race 1 there is disposed a cylindrical form 3 which first shall be considered as being made of nonferromagnetic material. The form 3 is wound with helical turns 4 of the coil 5 extending almost to the ends of the form 3. The coil 5 is supplied with alternating current by means of the connections 6 and 6'. The coil 5 may be connected with another and similar coil in respective arms of a bridge circuit energized with alternating current to permit determination of the impedance of the coil 5.

The current through the turns 4 forming the winding of the coil 5 produces a magnetic field which is represented by the dashed lines 7 of magnetic force. The magnetic flux of this field extends axially through the opening 2 of the race 1 and merges above the curved outer lines of force. The longer the coil 5 is in comparison to the axial dimension of the race 1, the weaker the outer field intensity of the returning lines of force and the fewer returning outer lines of force intersect with the race 1. If, as indicated in the figure, the length of the coil 5 is a multiple of the axial dimension of the race 1, only a small portion 8 of the outer lines of force will impinge upon the race 1. This condition can be met when the axial length of the coil is about three times that of the workpiece. A greater length of the coil will reduce to an even larger extent the quantity of lines intersecting the workpiece. Due to the high outer demagnetization factor of the annular body in the axial direction, the small portion of force lines intercepted by the race contributes only insignificantly to the magnetization of the race.

In accordance with the law of induction, the alternating magnetic flux extending axially through the aperture of the workpiece produces an electrical voltage which causes a rotating alternating current in the workpiece 1. The circularly flowing alternating current in the workpiece 1 produces an alternating magnetic field 9, which loops around the cross section of race 1 and which is superimposed upon the primary field of coil 5. The alternating field 9 superimposed upon the primary field of coil 5 reflects itself as a change of impedance of coil 5 and can be discerned in magnitude and phase. Both values can be used to determine important parameters of the workpiece 1, such as electrical conductivity and magnetic permeability, which are intimately associated with the metallurgical properties of the workpiece and which are useful to provide an indication, for example, of the alloy and tempering condition, and thus of hardness and strength.

It is evident that in the present arrangement self-demagnetization effects can occur only rarely even when testing extremely short workpieces as for all practical purposes only the ring-like, closed alternating field 9 is effective. Hence, the permeability determined is the actual material permeability and not the greatly reduced shape permeability.

If the coil form 3 made of non-ferromagnetic material is replaced by a core 3 of a low-loss, high-permeability material, such as ferrite ceramic or thin transformer laminations, the magnetic flux passing through the opening of bearing race 1 is increased by the factor of the shape permeability $\mu_{FK}$ of the core 3. For a given length $l$ and diameter $d$ of the core 3, the shape permeability and hence the amplification factor of the magnetic flux through the opening in race 1 can be calculated according to an approximation formula developed by the inventor:

$$\mu_{FK} \approx 6 \cdot l/d - 5$$

which applies when the material permeability is at least a multiple of $\mu_{FK}$ and when the value of $l/d$ is between 2 and 10. If the value $l/d$ of the core is 10, an amplification factor of 55 is obtained for the alternating magnetic flux, i.e., the current density in the race 1 caused by the flux has increased by a factor of 55. Moreover, a ferromagnetic core 3 additionally increases the loading reflected on the primary field due to the circularly flowing current. If in the present example it is assumed that this additional increase amounts to a factor of approximately 2, the total increase of the measured effect caused by the workpiece 1 using a ferromagnetic coil core with ratio $l/d$ equal 10 would be approximately a factor of 100.

When inspecting and sorting mass-produced workpieces with the previously known arrangements, it has been necessary to feed the workpieces individually to the test coil, since the proximity of a neighboring part to the part under inspection would affect the measurement. Isolation frequently required significant effort to accomplish mechanical separation of the workpieces. In the arrangement according to the present invention, adjacent parts do not affect the test result in view of the fact that the test information is derived solely from the loading of the alternating toroidal field 9 in the workpiece 1 upon the primary field extending through the opening of the workpiece. This lack of sensitivity of the test results with regard to neighboring parts located in close proximity to the workpiece under test provides for a simple automation of the inspection procedure wherein workpieces aligned longitudinally in close sequence are fed continuously through the inspection device. The inspection device in accordance with this invention comprises then a testing coil 5 and a core 3 mounted movable relative to the chain of workpieces. By means of a limit switch or a proximity switch, controlled by the workpieces, the testing coil becomes disposed briefly in the aperture of each of the workpieces. The length of the coil within the aperture of the workpiece is controlled by a stop which is set in such a manner as to achieve maximum response when the coil is surrounded by the workpiece. It is advantageous that this response occur within a broad region of mechanical alignment so that axial displacement of the workpiece relative to the coil during measurement does not result in a significant change in the measured value. Hence, the measured value remains constant for a given period of time while the coil is moving, permitting higher testing speeds. After the workpiece has been subjected to the test as outlined, it is fed to a sorting device which separates the workpiece into various quality groups responsive to the inspection results obtained.

It has been discerned, furthermore, that the lateral position of the coil or that of the core within the workpiece opening is relatively uncritical. This results from the fact that the electrical voltage which causes the circular current flow in the workpiece is only a function of the total magnetic flux and not dependent upon the location at which the magnetic flux penetrates through the opening of the workpiece. The fact that the lateral position does not significantly affect the test result presents an additional simple arrangement for an automatic test apparatus. The inspection device, i.e., the combination of testing coil 5 and core 3, is constructed as a plug disposed on a rotating wheel. With every revolution of the wheel, the plug picks up a workpiece from a chain of workpieces which are advanced to the wheel by a chute comprising two pieces of angle sheet metal. As the wheel rotates, the part located in the inspection apparatus is inspected and advanced. After approximately half a revolution of the wheel the workpiece is dropped and sorted into a predetermined quality group on the basis of the inspection results.

Figure 2:
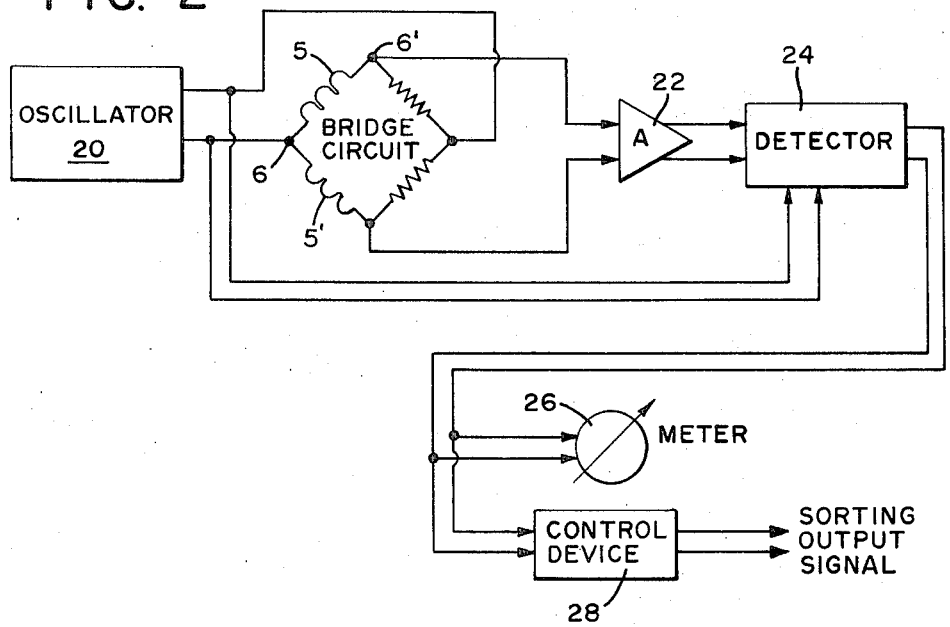
FIG. 2 is a schematic electrical block diagram of the test circuit.

FIG. 2 illustrates a schematic electrical block diagram of the typical test circuit indicated. An alternating current bridge circuit comprises in respective branches the test coil 5, another substantially equal coil 5' and a pair of resistors. The bridge circuit at the beginning of the test is balanced by zeroizing means (not shown) as is well known to those skilled in the art. An oscillator 20 energizes the winding of coil 5 with an alternating current signal. The output from the bridge circuit is fed to an amplifier 22 and a detector circuit 24 which receives also phase information of the signal originally fed to the coil 5 from the oscillator 20. The detector circuit provides an output signal which is responsive to the change caused by the workpiece under test surrounding the coil 5 and such signal is displayed at a meter 26. Optionally, a control device 28 is coupled in parallel with the meter 26 for providing a sorting signal to cause during automatic feeding segregation of workpieces tested by grades of their respective quality.

What is claimed is:

1. An apparatus for testing the quality of a short apertured electrically conductive workpiece, such as a washer, nut or wrist pin, by the eddy current test method comprising:
    first means adapted to be disposed in the aperture of the workpiece for establishing an alternating magnetic field which produces eddy currents in the workpiece portion surrounding the aperture, and said first means being dimensioned relative to the workpiece to cause a significant portion of the magnetic lines of force comprising said field to pass outside the workpiece for preventing magnetization of the workpiece, and
    second means coupled in circuit with said first means for determining the loading reflected upon said magnetic field in response to the eddy currents induced in the workpiece, whereby to evaluate the quality of the workpiece.

2. An apparatus as set forth in claim 1, said first means comprising an air-core coil disposed in and extending through the aperture of the workpiece, and means coupled for energizing said coil with alternating current.

3. An apparatus as set forth in claim 2, and the axial length of said coil being large relative to the axial dimension of the workpiece.

4. An apparatus as set forth in claim 3, the axial length of said coil being at least three times the axial dimension of the workpiece.

5. An apparatus as set forth in claim 1, said first means comprising a coil wound upon a ferromagnetic core, said coil being disposed in and extending through the aperture of the workpiece, and means coupled for energizing said coil with alternating current.

6. An apparatus as set forth in claim 5, and the axial length of said coil being large relative to the axial dimension of the workpiece.

7. An apparatus as set forth in claim 6, the axial length of said coil being at least three times the axial dimension of the workpiece.

8. An apparatus as set forth in claim 1, said first means comprising a coil wound upon a non-ferromagnetic core, said coil being disposed in and extending through the aperture of the workpiece, and means coupled for energizing said coil with alternating current.

9. The method for testing the quality of a short apertured electrically conductive workpiece, such as a washer, nut or wrist pin by the eddy current test method comprising:
    disposing an electromagnetic coil in the aperture of the workpiece, said coil having an axial length which is a multiple of that of the workpiece and sufficiently long to provide upon energizing said coil with alternating current a magnetic field which causes eddy currents in the workpiece portion surrounding the aperture while the magnetic lines of force comprising said field substantially pass outside the workpiece to prevent magnetization of the workpiece;
    energizing said coil with alternating current, and
    determining the loading upon said magnetic field responsive to the magnetic field induced eddy currents in the workpiece, whereby to evaluate the quality of the workpiece.

* * * * *